United States Patent
Nguyen et al.

(10) Patent No.: US 12,330,117 B1
(45) Date of Patent: Jun. 17, 2025

(54) APPLYING METAL ALKALINE AND MICROWAVE PYROLYSIS FOR SEPARATING AND CAPTURING CARBON DIOXIDE FROM EXHAUST GAS

(71) Applicant: Halliburton Energy Services, Inc., Houston, TX (US)

(72) Inventors: Philip D. Nguyen, Houston, TX (US); Ronald Glen Dusterhoft, Houston, TX (US); Ronald Bosch, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/545,133

(22) Filed: Dec. 19, 2023

(51) Int. Cl.
| | |
|---|---|
| E21B 41/00 | (2006.01) |
| B01D 53/14 | (2006.01) |
| B01D 53/62 | (2006.01) |
| B01D 53/78 | (2006.01) |
| B01D 53/81 | (2006.01) |
| B01D 53/96 | (2006.01) |
| C01D 7/07 | (2006.01) |
| C01F 5/24 | (2006.01) |
| C01F 11/18 | (2006.01) |

(52) U.S. Cl.
CPC ......... B01D 53/62 (2013.01); B01D 53/1425 (2013.01); B01D 53/1475 (2013.01); B01D 53/1493 (2013.01); B01D 53/78 (2013.01); B01D 53/81 (2013.01); B01D 53/96 (2013.01); C01D 7/07 (2013.01); C01F 5/24 (2013.01); C01F 11/18 (2013.01); E21B 41/0064 (2013.01); B01D 2251/304 (2013.01); B01D 2251/306 (2013.01); B01D 2251/402 (2013.01); B01D 2251/404 (2013.01); B01D 2251/602 (2013.01); B01D 2251/604 (2013.01); B01D 2257/504 (2013.01); B01D 2258/02 (2013.01)

(58) Field of Classification Search
CPC ........................................................ E21B 43/26
See application file for complete search history.

(56) References Cited

U.S. PATENT DOCUMENTS

| | | | | |
|---|---|---|---|---|
| 6,398,921 | B1 * | 6/2002 | Moraski | C03B 5/12 210/748.07 |
| 7,282,189 | B2 * | 10/2007 | Zauderer | C01B 3/02 423/220 |
| 7,699,909 | B2 | 4/2010 | Lackner et al. | |
| 7,919,064 | B2 | 4/2011 | Kawatra et al. | |

(Continued)

FOREIGN PATENT DOCUMENTS

WO 2023053067 A1 4/2023

OTHER PUBLICATIONS

Theo Chronopoulos et al., "CO2 Desorption Via Microwave Heating for Post-Combustion Carbon Capture" Microporous and Mesoporous Materials. vol. 197 (2014) pp. 288-290.

(Continued)

*Primary Examiner* — Silvana C Runyan
(74) *Attorney, Agent, or Firm* — Conley Rose, P.C.; Rodney B. Carroll

(57) ABSTRACT

A method including reacting carbon dioxide from exhaust gas produced at a wellsite to produce a solid metal carbonate, and microwaving the solid metal carbonate to produce recovered carbon dioxide and solid metal alkaline. A system for carrying out the method is also provided.

20 Claims, 5 Drawing Sheets

(56) References Cited

U.S. PATENT DOCUMENTS

| | | |
|---|---|---|
| 8,894,830 B2 | 11/2014 | Gilliam et al. |
| 9,260,314 B2 | 2/2016 | Constantz et al. |
| 9,440,189 B2 | 7/2016 | Mercier et al. |
| 9,435,585 B2 | 9/2016 | Lam |
| 9,585,419 B2 | 3/2017 | Stromotich et al. |
| 9,682,359 B2 | 6/2017 | Skoptsov et al. |
| 11,358,113 B2 | 6/2022 | Strohm et al. |
| 11,524,759 B2 | 12/2022 | Singh |
| 11,559,767 B2 | 1/2023 | Wang et al. |
| 2004/0200393 A1* | 10/2004 | Zauderer .......... C01B 3/02 110/345 |
| 2010/0078167 A1* | 4/2010 | Bunger .......... C10G 1/00 208/400 |
| 2011/0033355 A1* | 2/2011 | Smith .......... C01D 7/123 423/423 |
| 2013/0081934 A1 | 4/2013 | New |
| 2013/0280152 A1 | 10/2013 | Singh |
| 2020/0129916 A1* | 4/2020 | Constantz .......... B01D 53/1475 |
| 2021/0261453 A1 | 8/2021 | Vik et al. |
| 2022/0370955 A1 | 11/2022 | Thomas et al. |
| 2023/0191318 A1 | 6/2023 | Yan et al. |

OTHER PUBLICATIONS

Changze Yang et al., "A Review on the Microwave-Assisted Pyrolysis of Waste Plastics" Processes 2023, 11, 1487. pp. 1-22.

Xuan Hu et al., "Microwave-Assisted Pyrolysis of Waste Plastics for Their Resource Reuse: A Technical Review" Carbon Resources Conversion 6, 2023. pp. 215-228.

* cited by examiner

APPLYING METAL ALKALINE AND MICROWAVE PYROLYSIS FOR SEPARATING AND CAPTURING CARBON DIOXIDE FROM EXHAUST GAS

TECHNICAL FIELD

The present disclosure relates generally to systems and methods of sequestering carbon dioxide ($CO_2$). More specifically, this disclosure relates to capturing $CO_2$ from an exhaust gas comprising $CO_2$ by contact of the exhaust gas comprising $CO_2$ with metal alkaline to produce solid metal carbonate, and separating recovered $CO_2$ from the solid metal carbonate by microwave pyrolysis.

BACKGROUND

Natural resources (e.g., oil or gas) residing in a subterranean formation can be recovered by driving resources from the formation into a wellbore using, for example, a pressure gradient that exists between the formation and the wellbore, the force of gravity, displacement of the resources from the formation using a pump or the force of another fluid injected into the well or an adjacent well. A number of wellbore servicing fluids can be utilized during the formation and production from such wellbores. For example, in embodiments, the production of fluid in the formation can be increased by hydraulically fracturing the formation. That is, a treatment fluid (e.g., a fracturing fluid) can be pumped down the wellbore to the formation at a rate and a pressure sufficient to form fractures that extend into the formation, providing additional pathways through which the oil or gas can flow to the well. Subsequently, oil or gas residing in the subterranean formation can be recovered or "produced" from the well by driving the fluid into the well. During production of the oil or gas, substantial quantities of produced water, which can contain high levels of total dissolved solids (TDS) can also be produced from the well, and a variety of exhaust gases and flare gases conventionally sent to flare can be formed. For example, oil and gas wells produce oil, gas, and/or byproducts from subterranean formation hydrocarbon reservoirs. A variety of subterranean formation operations are utilized to obtain such hydrocarbons, such as drilling operations, completion operations, stimulation operations, production operations, enhanced recovery operations, and the like. Such subterranean formation operations typically use a large number of vehicles, heavy equipment, and other apparatus (collectively referred to as "machinery" herein) in order to achieve certain job requirements, such as treatment fluid pump rates. Such equipment may include, for example, pump trucks, sand trucks, cranes, conveyance equipment, mixing machinery, and the like. Many of these operations and machinery utilize combustion engines that produce exhaust gases (e.g., including carbon dioxide ($CO_2$)/greenhouse gas emissions) that can be emitted into the atmosphere.

BRIEF SUMMARY OF THE DRAWINGS

For a more complete understanding of this disclosure, reference is now made to the following brief description, taken in connection with the accompanying drawings and detailed description, wherein like reference numerals represent like parts.

Figure 1:
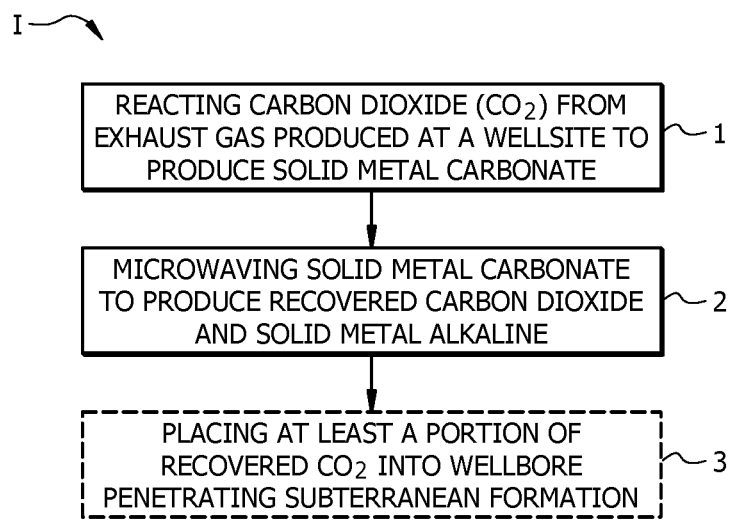
FIG. 1 is a schematic flow diagram of a method, according to embodiments of this disclosure.

While embodiments of this disclosure are depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". For example, reference to metal alkaline solution 16 can, in instances, include metal alkaline solution 16 and additional metal alkaline solution 16A of FIG. 2B and FIG. 2C.

To facilitate a better understanding of the present disclosure, the following examples of certain embodiments are given. In no way should the following examples be read to limit, or define, the scope of the disclosure. Embodiments described below with respect to one implementation are not intended to be limiting.

Carbon dioxide ($CO_2$) capture technologies can be expensive to implement and operate. The energy-intensive processes involved in capturing, separating, and compressing $CO_2$ from exhaust (e.g., flue) gases can conventionally result in additional costs for power plants and industries. $CO_2$ capture processes often require a considerable amount of energy, which can increase the cost of electricity generation and make it less economically attractive to capture $CO_2$. The regeneration of $CO_2$-sorbent is another challenge. The sorbent conventionally utilized in $CO_2$ capture technologies must be regenerated after it has captured $CO_2$. This process typically requires heat, which can add to the energy consumption of $CO_2$ capture. The scaling up of conventional $CO_2$ capture technologies to commercial scale can also be challenging and expensive.

Herein disclosed are systems and methods for capturing $CO_2$ from exhaust gases. The methods comprise using metal alkaline as sorbent material to absorb and separate $CO_2$ from the exhaust gas and form metal carbonate. Microwave pyrolysis, which applies microwave energy to release the captured $CO_2$ from the metal carbonate and thus regenerate the metal alkaline, is subsequently utilized. Substantially pure $CO_2$ gas, for subsequent utilization or storage, can be collected from the microwave pyrolysis. The regenerated metal alkaline sorbent can be reintroduced into the $CO_2$ capture step to continue the cycle of absorption and regeneration.

As detailed herein, metal alkaline and microwave pyrolysis offer promising processes for separating and capturing $CO_2$ from exhaust gas comprising $CO_2$, which may prove beneficial in reducing greenhouse gas emissions. The microwaves can be utilized to selectively heat the metal carbonate, causing decomposition thereof and concomitant release of the captured $CO_2$ (referred to herein as "recovered $CO_2$"). The released, recovered $CO_2$ can then be collected for utilization and/or storage. The regenerated metal alkaline (e.g., metal oxide or metal alkaline solution (e.g., metal hydroxide), as discussed hereinbelow) can be recycled back to capture additional $CO_2$ in the exhaust gas. As noted above, the cycle of $CO_2$ absorption and regeneration of metal alkaline can continue repeatedly.

Description of a system and method of this disclosure will now be made with reference to FIG. 1, which is a schematic flow diagram of a method I, according to embodiments of this disclosure, FIG. 2A, FIG. 2B, and FIG. 2C, which are schematics of system IIA, system IIB, and system IIC, respectively, according to embodiments of this disclosure. As depicted in FIG. 1, a method I of this disclosure comprises reacting carbon dioxide from exhaust gas produced at a wellsite to produce a solid metal carbonate, as depicted at 1; and microwaving the solid metal carbonate (e.g., subjecting the solid metal carbonate to microwave pyrolysis) to produce recovered carbon dioxide and solid metal alkaline, as depicted at 2. As depicted at 3, the method I can further comprise placing at least a portion of the recovered carbon dioxide into a wellbore penetrating a subterranean formation, as indicated at 3.

Figure 2A:
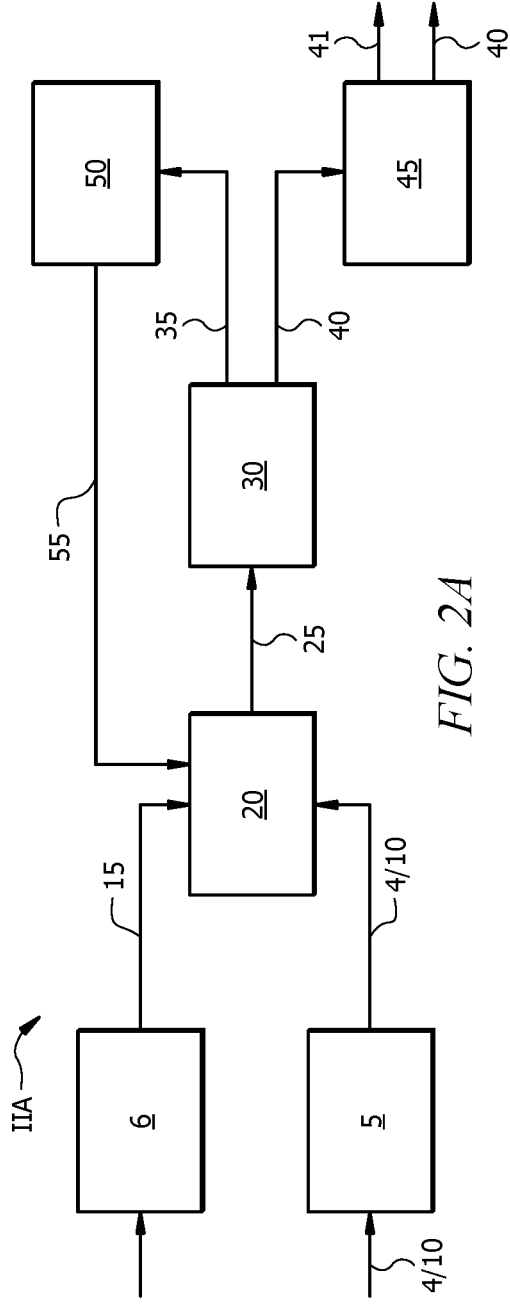
FIG. 2A is a schematic of a system, according to embodiments of this disclosure.
Figure 2B:
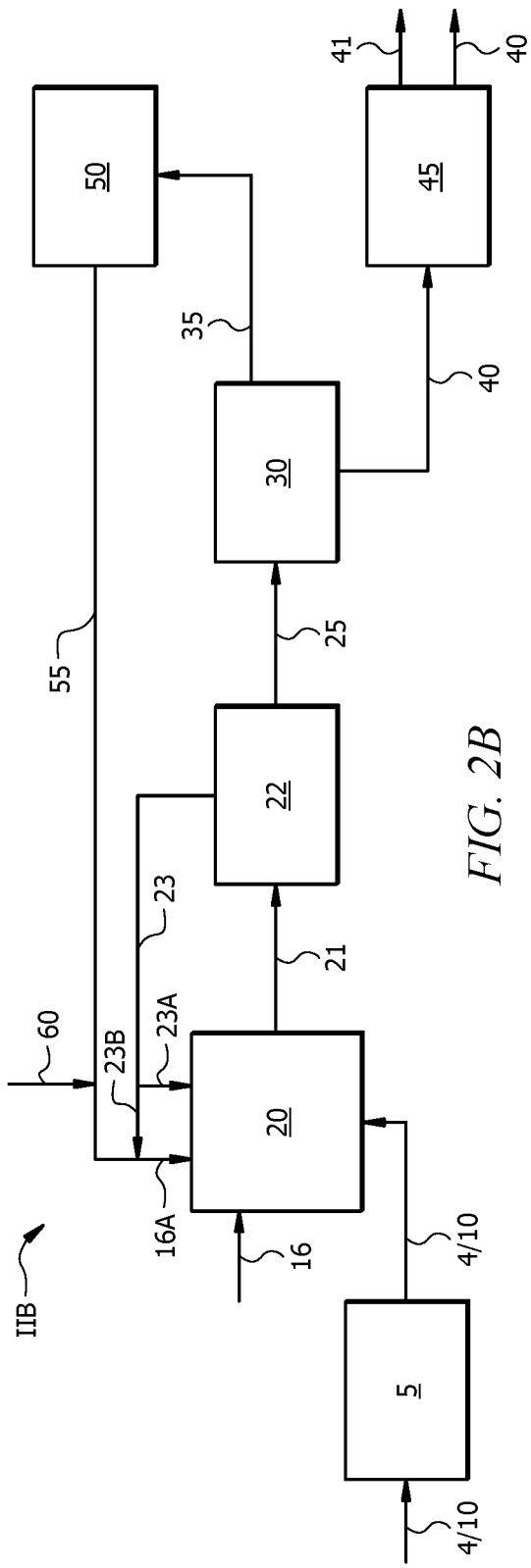
FIG. 2B is a schematic of a system, according to embodiments of this disclosure.
Figure 2C:
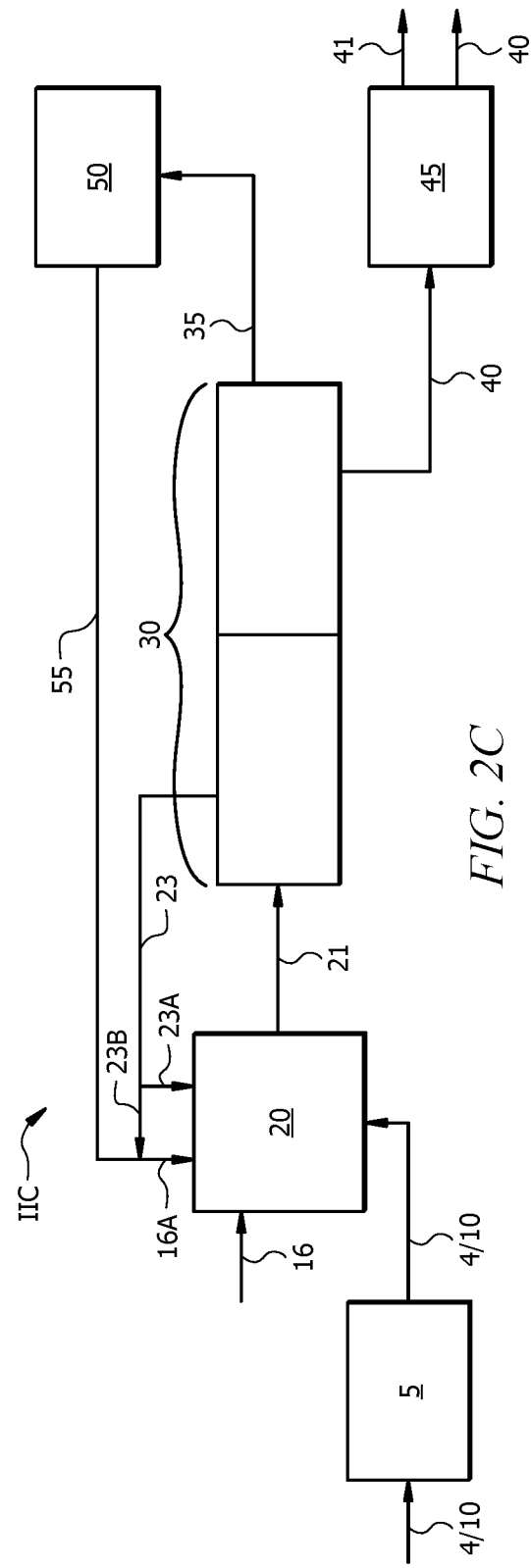
FIG. 2C is a schematic of a system, according to embodiments of this disclosure.

With reference to FIGS. 2A-2C, a system IIA-IIC of this disclosure comprises: a metal carbonate production reactor 20 configured for reacting carbon dioxide 10 from exhaust gas 4 (e.g., which can be produced, at least in part, at a wellsite (270, FIG. 3 described hereinbelow)) with a metal alkaline 15/16 to produce a solid metal carbonate 25; and a microwave pyrolysis reactor 30 configured for microwaving the solid metal carbonate 25 to produce recovered carbon dioxide 40 and solid metal alkaline 35. The recovered carbon dioxide 40 can be substantially pure $CO_2$ (e.g., can comprise greater than or equal to about 99, 99.5, or 99.9% pure carbon dioxide).

The system IIA/IIB/IIC can further comprise pumping apparatus (pumps 240 FIG. 4, described hereinbelow) configured for placing at least a portion of the recovered carbon dioxide 40 or a product 41 produced therefrom (also referred to herein as an intermediate product 41) into a wellbore 275 (FIG. 3, described hereinbelow) penetrating a subterranean formation 260. The system IIA/IIB/IIC can further comprise downstream production storage and/or production apparatus 45 configured to store and/or produce an intermediate product 41 from at least a portion of the recovered $CO_2$ 40. In such embodiments, a pumping apparatus 240 can be configured for placing the recovered $CO_2$ 40 and/or the intermediate product 41 into storage 45 and/or placing the intermediate product 41 into the wellbore 275. Thus, in embodiments, recovered $CO_2$ 40 can be stored in storage and/or intermediate product production apparatus 45, and extracted therefrom, for example, when subsequently utilized. In embodiments, storage and/or intermediate product production apparatus 45 is configured to produce intermediate product 41, intermediate product 41 can be stored in storage and/or intermediate product production apparatus 45, and/or the intermediate product 41 can be extracted from storage and/or intermediate product production apparatus 45, for example, for introduction downhole or other usage.

The metal alkaline 15/16 can be a solid (e.g., solid metal alkaline 15) or a liquid (e.g., metal alkaline solution 16), as detailed further hereinbelow with reference to FIG. 2A, FIG. 2B, and FIG. 2C.

Figure 3:
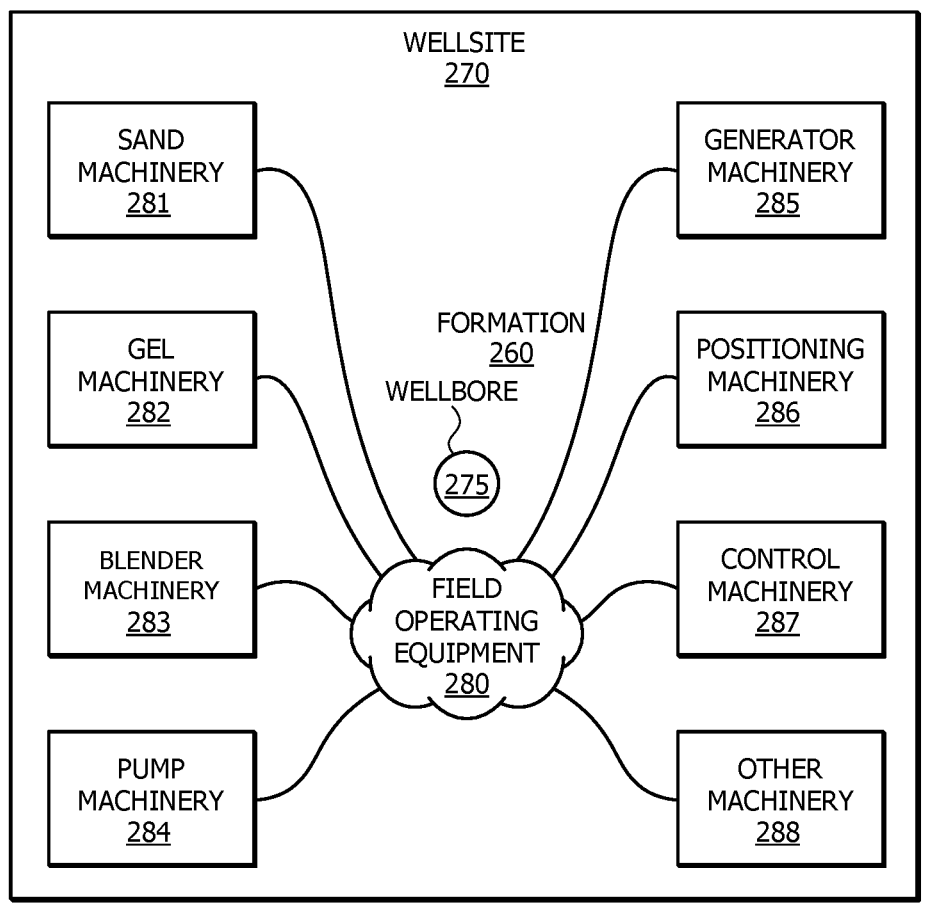
FIG. 3 is a schematic of a plurality of machinery that may be located and operated at a wellsite for performing a subterranean formation operation and may produce exhaust gas comprising $CO_2$, according to embodiments of the present disclosure.

In embodiments, a method of capturing $CO_2$ from the exhaust gas 4 comprises: selecting metal alkaline found in metal oxides 15, such as calcium oxide (CaO) and magnesium oxide (MgO), which can react with $CO_2$ and form stable metal carbonates 25, grinding the metal oxide 15 into (or providing the metal oxide 15 as) a fine powder of desired particle size to increase its surface area and reactivity, exposing the metal oxide 15 fine particulates to $CO_2$ 10 or $CO_2$-containing exhaust gas 4 (e.g., from power plants, industrial processes, or the exhaust gas captured from oilfield equipment, as described further hereinbelow with reference to FIG. 3), for example at temperatures between 300° F. to 500° F. to allow $CO_2$ 10 to react with metal oxide 15 to form metal carbonate 25. The metal carbonate 25 formation can be effected via spraying towers, fluidized bed reactors, and/or packed columns. The solid metal carbonate 25 that is formed can then be separated from the metal alkaline sorbent 15, and the solid metal carbonate 25 can be subjected to microwave pyrolysis (e.g., in microwave pyrolysis reactor 30) to apply microwave energy to the metal carbonate 25, causing thermal decomposition, release of recovered $CO_2$ 40, and reforming of the original metal oxide 15, extracted from microwave pyrolysis reactor 30 as solid metal alkaline 35.

Accordingly, in embodiments, as depicted in the embodiment of FIG. 2A, reacting carbon dioxide 10 from (or in) exhaust gas 4 produced at the wellsite 275 to produce the solid metal carbonate 25 can comprise: reacting the carbon dioxide 10 with a metal oxide 15 to produce the solid metal carbonate 25. In such embodiments, the metal alkaline can thus be a solid metal alkaline comprising a solid metal oxide 15. The solid metal oxide 15 can have a surface area of at least 5, 10, 20, 30, 40, 50, 60, 70, 80, 90, 100, 200, 300, 400, 500, 600, 700, 800, 900, 1000, 2000, 3000, 4000, or 5000 $m^2$/gram, a surface area in any range thereamong; an average size of less than or equal to about 5, 10, 20, 30, 40, 50, 60, 70, 80, 90, or 100 m, or 1, 2, 3, 4, or 5 mm, or an average size in any range thereamong; or a combination thereof. The solid metal oxide 15 can be produced by diminution (e.g., grinding) of a coarse metal oxide, for example in a grinding apparatus 6, to provide a solid metal oxide having a desired surface area and/or size.

In embodiments, the solid metal oxide 15 comprises calcium oxide, magnesium oxide, or a combination thereof, and the metal carbonate 25 respectively produced via reaction of the solid metal oxide 15 and the $CO_2$ 10 can comprise calcium carbonate ($CaCO_3$), magnesium carbonate ($MgCO_3$), or a combination thereof.

Examples for reactions of $CO_2$ with metal oxide 15 (e.g., in metal carbonate production reactor 20 of FIG. 2A) can thus include the reaction of Equation (1) or Equation (2):

$$CaO + CO_2 \rightarrow CaCO_3 \quad \text{Eq. (1)}$$

$$MgO + CO_2 \rightarrow MgCO_3 \quad \text{Eq. (2)}$$

Reacting carbon dioxide 10 from exhaust gas 4 produced at the wellsite 270 to produce the solid metal carbonate 25 can comprise exposing the solid metal oxide 15 to the exhaust gas 4 comprising $CO_2$ (e.g., at a temperature in a range of from about 300° F. to about 500° F.). As noted above, exposing the solid metal oxide 15 to the exhaust gas 4 comprising $CO_2$ 10 can be effected via a spraying tower, a fluidized bed reactor, a packed column, or a combination thereof. In embodiments, the metal carbonate production reactor 20 comprises a fluidized bed reactor comprising a fluidized bed of metal oxide 15 fluidized by the exhaust gas 4. In embodiments, the metal carbonate production reactor 20 comprises a packed column of metal oxide 15 through which the exhaust gas 4 flows.

By way of examples, in embodiments, microwave pyrolysis in microwave pyrolysis reactor 30 results in the release of recovered $CO_2$ 40 and (regenerated) solid metal alkaline 35 (e.g., CaO, MgO) according to Equation (3) and/or Equation (4):

$$CaCO_3 \rightarrow CaO + CO_2 \quad \text{Eq. (3)}$$

$$MgCO_3 \rightarrow MgO + CO_2 \quad \text{Eq. (4)}$$

The recovered $CO_2$ 40 can be sent to utilization and/or storage apparatus 45 after the microwave pyrolysis. The regenerated metal alkaline 35 can be reintroduced into the carbonation process to capture more $CO_2$ 10 from the exhaust gas 4. All or a portion of the solid metal alkaline 35 can be stored in solid metal alkaline storage 50 and/or can be sent as recycle solid metal alkaline 55 (e.g., to metal carbonate production reactor 20) for the production of additional solid metal carbonate 25 therefrom. Thus, in embodiments, no metal alkaline storage 50 is utilized, and metal alkaline 35 can be the same stream as recycle metal alkaline 55.

With reference to FIG. 2B and FIG. 2C, in embodiments, a method of capturing $CO_2$ from the exhaust gas 4 comprises: preparing a metal alkaline solution 16 by dissolving a metal alkaline (e.g., recycle metal alkaline 55), such as alkaline hydroxides like sodium hydroxide (NaOH) or potassium hydroxide (KOH) in water. The metal alkaline solution 16 has a high affinity for $CO_2$ and can react with $CO_2$ to form stable carbonates 25. Contacting the exhaust gas 4 with metal alkaline solution 16 can comprise the exhaust gas stream 4 into the metal alkaline solution 16. This can be done, for example, via the use of a batch reactor, a sequential batch reactor, a continuous-flow reactor, or a continuous stirred tank reactor, or a combination thereof. In embodiments, the metal carbonate production reactor 20 of FIG. 2B/2C comprises a spray tower or other reactor comprising a continuous gas phase of the exhaust gas 4 comprising $CO_2$ 10 and a dispersed liquid phase comprising the metal alkaline solution 16.

The method IIB/IIC further comprises allowing the $CO_2$ 10 in the exhaust gas 4, which exhaust gas 4 can also contain as other gases such as nitrogen and sulfur dioxide, to react with metal alkaline (e.g., 16/16A) to form solid metal carbonates 25, while leaving other gases unreacted. By way of example, with metal alkaline solution 16 can, in embodiments, comprise aqueous sodium hydroxide (NaOH), and the metal carbonate production reaction can comprise the reaction of Equation (5):

$$CO_2 + 2NaOH \rightarrow Na_2CO_3 + H_2O \quad \text{Eq. (5)}.$$

The solid metal carbonate 25 (e.g., $Na_2CO_3$) can be a stable compound that remains undissolved in the metal carbonate solution 21. The method I of this disclosure can thus further comprise separating the solid metal carbonate 25 from the metal carbonate solution 21 and the exhaust gas stream 4 by using a solid/liquid separator 22. By way of examples, solid/liquid separator 22 can comprise one or more settling tanks or other separation apparatus.

As with the solid absorbent case discussed hereinabove with reference to FIG. 2A, the separated metal carbonate 25 can be subjected to microwave pyrolysis to apply microwave energy to the metal carbonate 25, causing thermal decomposition, releasing recovered $CO_2$ 40, and reforming the original metal alkaline 35, as shown with reference to sodium carbonate 25 in Equation (6):

$$Na_2CO_3 \rightarrow Na_2O + CO_2 \quad \text{Eq. (6)}.$$

The $Na_2O$ can be readily dissolved in water to provide NaOH (e.g., $Na_2O + H_2O \rightarrow 2NaOH$), which can be recycled to prepare metal alkaline solution to produce metal carbonate solution comprising solid metal carbonate in water. The released/recovered $CO_2$ 40 can be captured for utilization or storage in $CO_2$ storage and/or utilization 45 after the microwave pyrolysis. The regenerated metal alkaline 35 can be stored in metal alkaline storage 50 and/or recycled as recycle metal alkaline stream 55 into the carbonation process to capture more $CO_2$ 10 from exhaust gas 4.

Accordingly, in embodiments, reacting carbon dioxide 10 from exhaust gas 4 produced at the wellsite 270 to produce the solid metal carbonate 25 at 1 can further comprise: reacting the carbon dioxide 10 with a metal alkaline solution 16 (which can include fresh metal alkaline solution 16 and/or recycled metal alkaline solution 16A) to produce a metal carbonate solution 21 comprising the solid metal carbonate 25 in water. As noted above, the metal alkaline solution 16 can comprise an aqueous alkaline hydroxide, such as, for example, aqueous sodium hydroxide (NaOH), potassium hydroxide (KOH), or a combination thereof. Reacting the carbon dioxide 10 with the metal alkaline solution 16/16A to produce the metal carbonate solution 21 comprising solid metal carbonate 25 in water can further comprise contacting the exhaust gas 4 with the metal alkaline solution 16/16A. Contacting the exhaust gas 4 with the metal alkaline solution 16/16A can comprise introducing (e.g., bubbling, sparging, etc.) the exhaust gas 4 into the metal alkaline solution 16.

As noted hereinabove, the exhaust gas 4 can be contacted with the metal alkaline solution 16/16A via a metal carbonate production reactor 20 comprising a batch reactor, a sequential batch reactor, a continuous-flow reactor, a continuous stirred tank reactor, or a combination thereof.

In embodiments, as noted above, the metal alkaline solution 16 comprises aqueous sodium hydroxide (NaOH), aqueous potassium hydroxide (KOH), or a combination thereof, and the metal carbonate 25 respectively comprises sodium carbonate ($Na_2CO_3$), potassium carbonate ($K_2CO_3$), or a combination thereof.

In embodiments wherein the metal alkaline is provided as a metal alkaline solution 16 comprising the metal alkaline (e.g., recycled solid metal alkaline 35 dissolved) in water, the method can further comprise separating water 23 from the metal carbonate solution 21 prior to or during the microwaving, at 2, the solid metal carbonate 25 to produce recovered carbon dioxide 40 and solid metal alkaline 35. At least a portion of the separated water 23 can be combined with the regenerated solid metal alkaline 35 (and/or "fresh" solid metal alkaline utilized to form "fresh" metal alkaline solution 16) to produce additional metal alkaline solution 16A.

As depicted in FIG. 2A, in embodiments, a solids/liquid separator 22 disparate from microwave pyrolysis reactor 30 can be utilized to separate water 23 from solid metal carbonate 25 prior to microwaving the solid metal carbonate 25, at 2. Alternatively or additionally, as depicted in FIG. 2C, in embodiments, microwave pyrolysis reactor 30 can serve to separate water 25 from metal carbonate solution 21 and to separate recovered carbon dioxide 40 from solid metal alkaline 35. In such embodiments, a disparate solid/liquid separator 22 can be absent.

The regenerated solid metal alkaline 35 can be recycled (e.g., directly via 35/55 or via solid metal alkaline storage 50) to produce additional solid metal carbonate 25 by reaction thereof with additional carbon dioxide 10 from exhaust gas 4 produced at the wellsite 270.

Accordingly, in embodiments, reacting carbon dioxide 10 from exhaust gas 4 produced at the wellsite 270 to produce solid metal carbonate 25 at 1 can be effected by contacting the carbon dioxide 10 with a metal hydroxide solution 16 comprising water 23 and a metal hydroxide to produce a metal carbonate solution 21 comprising the solid metal carbonate 25 and water 23, and contacting the solid metal alkaline 35/55 with water 23/23A/23B to produce additional metal hydroxide solution 16A, and producing additional metal carbonate solution 21 by contacting the additional metal hydroxide solution 16A with carbon dioxide 10 from exhaust gas 4 produced at the wellsite 270.

As mentioned above, at least a portion of the recovered carbon dioxide 40 can be introduced into the wellbore 275 penetrating the subterranean formation 260. Alternatively or additionally, at least the portion of the carbon dioxide 40 can be converted to an intermediate product 41 that can optionally be placed into the wellbore 275 or otherwise utilized or sold. By way of nonlimiting examples, the storage and/or production apparatus 45 can comprise apparatus configured to produce formic acid, methanol, methane, or a combination thereof from recovered carbon dioxide 40 as the intermediate product 41. The intermediate product 41 can subsequently be introduced downhole (e.g., as a component of a wellbore treatment fluid 206, as discussed hereinbelow with reference to FIG. 4) or otherwise utilized or sold.

By way of nonlimiting examples, the recovered $CO_2$ 40 can be used in the production of carbonated beverages, in food processing, in fire extinguishers, in dry ice production, for medical applications, to produce chemical and pharmaceutical industry products, such as, for example, urea (e.g., fertilizer), salicylic acid, and/or for enhanced oil recovery (EOR) and other applications in the oil and gas industry. In embodiments, the recovered $CO_2$ 40 can be utilized to produce renewable fuels, such as, for example, synthesis gas (syngas), formate, methanol, methane, or a combination thereof. Other uses for the recovered $CO_2$ 40 will be apparent to those of skill in the art and with the help of this disclosure.

With reference to FIG. 2A, a system IIA of this disclosure can comprise a metal carbonate production reactor 20 configured for reacting the carbon dioxide 10 in exhaust gas 4 with a metal oxide 15/35/55 to produce the solid metal carbonate 25. In such embodiments, the metal oxide comprises a solid metal oxide (e.g., produced by diminution (e.g., grinding) of a coarse metal oxide), wherein the solid metal oxide has a surface area as described hereinabove (e.g., a surface area of at least 5 $m^2$/gram, 100 $m^2$/gram, or 5,000 $m^2$/gram); an average size as described hereinabove (e.g., an average size of less than or equal to about 5 μm, 100 μm, or 5 mm); or a combination thereof. The metal oxide can comprise calcium oxide, magnesium oxide, or a combination thereof, and the metal carbonate 25 can respectively comprise calcium carbonate, magnesium carbonate, or a combination thereof. The metal carbonate production reactor 20 can be configured for exposing the solid metal oxide 15/35/55 to the exhaust gas comprising $CO_2$ (e.g., at a temperature in a range of from about 300° F. to about 500° F.). The metal carbonate production reactor 20 can comprise a spraying tower, a fluidized bed reactor, a packed column, or a combination thereof.

With reference to FIG. 2B and FIG. 3B, in embodiments, the metal carbonate production reactor 20 can be configured for reacting the carbon dioxide 10 with a metal alkaline solution 16 to produce a metal carbonate solution 21 comprising the solid metal carbonate 25 in water 23. The metal alkaline solution 16 can comprise an aqueous alkaline hydroxide, such as, for example, sodium hydroxide (NaOH), potassium hydroxide (KOH), or a combination thereof. In the embodiments of FIG. 2B and FIG. 2C, the metal carbonate production reactor 20 can be configured for contacting the exhaust gas 4 comprising $CO_2$ 10 with the metal alkaline solution 16/16A. Contacting the exhaust gas 10 with the metal alkaline solution 16/16A in the metal carbonate production reactor 20 can be effected by introducing the exhaust gas 10 into metal alkaline solution 16/16A present in the metal carbonate production reactor 20. The metal carbonate production reactor 20 can comprise a spraying tower, a fluidized bed reactor, a packed column, or a combination thereof.

As noted hereinabove, the metal alkaline solution 16/16A in metal carbonate production reactor 20 can comprise aqueous sodium hydroxide (NaOH), aqueous potassium hydroxide (KOH), or a combination thereof, and the metal carbonate 25 can respectively comprise sodium carbonate ($Na_2CO_3$), potassium carbonate ($K_2CO_3$), or a combination thereof.

As noted above, in embodiments such as the embodiment of FIG. 2B, a system IIB of this disclosure can further comprise a solid/liquid separator 22 configured for separating water 23 from the metal carbonate solution 21. The separator 22 can comprise any solid/liquid separator operable to separate water 23 from solid metal carbonate 25. The separated water 23 can be sent as recycle to metal carbonate production reactor 20, for example, via 23A, for production of additional metal hydroxide solution 16A via combination with recycle solid metal oxide 35/55 via 23B, and/or can be utilized to produce "fresh" metal alkaline solution 16. A water recycle line 23B can thus be configured for combining at least a portion of the separated water 23 with the solid metal alkaline 35/55 to produce additional metal alkaline solution 16A for reaction with $CO_2$ 10 in the metal carbonate production reactor 20. A solid metal alkaline recycle line 55 can be configured for recycling the solid metal alkaline 35 to the metal carbonate production reactor 20 for the production of additional solid metal carbonate 25.

In embodiments, the metal carbonate production reactor 20 can be configured to produce solid metal carbonate 25 by contacting the carbon dioxide 10 in and/or from exhaust gas 4 with a metal hydroxide solution 16 comprising water and a metal hydroxide to produce a metal carbonate solution 21 comprising the solid metal carbonate and water, and the system IIB/IIC further comprises a fresh or recycle water line 23A/23B configured for combining the solid metal alkaline 35/55 with fresh water or recycle water in the fresh water line 23 or recycle water line 23, respectively, to produce additional metal hydroxide solution 16A for use in the metal carbonate production reactor 20.

Microwave radiation is a kind of electromagnetic radiation with a wavelength from 1 cm to 1 m and a frequency from 0.3 to 300 GHz. Conventional heating typically first heats up the surface of a material. The energy then transfers to the center by heat conduction. Thus, materials with low thermal conductivity will exhibit low energy efficiency in conventional pyrolysis. Microwave energy interacts with feedstock in three ways: (1) highly conductive materials regarded as conductors will reflect microwaves; (2) microwaves can directly penetrate insulators without being absorbed; (3) some dielectric mediums (e.g., water, wood, etc.) can adsorb microwave energy, and can consequently be heated up from the inside of the particle in the microwave field. Microwave heating is thus not limited by heat conduction. Based on the movement of molecules, microwaves heat up the material through three main mechanisms, including dipole polarization, which generates heat through high-speed rotation and collision between polarized molecules, interface polarization, also known as space charge polarization or Maxwell-Wagner polarization, and conduction, whereby microwaves cause the movement of free ions in the medium to generate current, which movement causes collision among ions, thus generating heat energy.

The energy of microwave-assisted pyrolysis (MAP) comes from microwave radiation, whereby the heat transfer mode is gradually diffused from the internal heating of the substance to the external, and the heat source and raw materials can be heated without contact. By contrast, conventional pyrolysis may use an electric heater or a burner, and the material may be heated from outside to reach the desired temperature via conduction.

Microwave heating is induced through interactions between microwave electromagnetic fields and molecules of treated materials. When microwave acts on raw materials, due to dipole rotation or ion conduction, the moving direction of polar molecules or ions changes with alternating electromagnetic field. Heat is thus generated by high-frequency friction induced by fast dipole reorientation. Electromagnetic energy is thus converted into heat energy via the molecules located in the field. Substances that can convert microwave radiation energy into heat energy are usually polar molecules or ionic compounds, and their ability to absorb and convert microwave radiation energy depends on the dielectric properties of the material. The worse the dielectric properties, the less the interaction with microwaves and the lower the thermal conversion efficiency.

Microwave power directly determines the heating rate of the microwaved material and is one of the key parameters in the pyrolysis process. The higher the microwave power, the greater the heating rate, mainly due to the increase in energy density, beneficial to the thermal effect. Microwave pyrolysis reactor 30 can operate at a microwave power of from about 100 watts (W) to about 10 kilowatts (kW) or a power in a range therebetween (e.g., from about 100 W to 1 kW, from about 500 W to about 5 kW, etc.) to release the recovered $CO_2$ 40.

The pyrolysis temperature can be adjusted to promote the release of recovered $CO_2$ 40. When the pyrolysis temperature is low, complete desorption may not be attained. When the pyrolysis temperature is too high, excessive pyrolysis can occur. The temperature within microwave pyrolysis reactor 30 can thus be adjusted in order to obtain the recovered $CO_2$ 40 In embodiments, microwave pyrolysis reactor 30 can operate at a temperature in a range of from about 300° C. to about 1200° C. or a temperature within a range therebetween (e.g., from about 500° C. to about 1,200° C., from about 300° C. to about 1000° C., etc.) to release the recovered $CO_2$ 40.

In embodiments, a method of this disclosure comprises microwaving a solid metal carbonate 25 to produce recovered carbon dioxide 40 and solid metal alkaline 35; and placing, at a wellsite 270, at least a portion of the recovered carbon dioxide 40 into a wellbore 275 penetrating a subterranean formation 260. Placing the at least the portion of the recovered carbon dioxide 40 into the wellbore 275 penetrating the subterranean formation 270 can further comprise converting the at least a portion of the recovered carbon dioxide 40 to an intermediate product 41 (e.g., in storage and/or product production apparatus 45) and placing the intermediate product 41 into the wellbore 275. In embodiments, the method further comprises producing the solid metal carbonate 25 by contacting a metal alkaline (e.g., solid metal alkaline 15/35/55 or metal alkaline solution 16/16A) with an exhaust gas 4 comprising carbon dioxide 10. In embodiments, at least a portion of the exhaust gas 4 can be produced at the wellsite 275 or another wellsite.

The exhaust gas 4 comprising carbon dioxide 10 can be obtained from a variety of exhaust gas sources 5. For example, the exhaust gas 4 can comprise an exhaust gas produced at the and/or another wellsite 270. As depicted in FIG. 3, which is a schematic of a plurality of machinery 280 from which an exhaust gas 4 can be produced, the machinery 280 (e.g., source 5 of exhaust gas 4) may be located and operated a wellsite 270 for performing a subterranean formation operation and may produce exhaust gas comprising captured $CO_2$ 10, according to embodiments of the present disclosure. The machinery from which the exhaust gas comprising $CO_2$ can be produced/sourced, in embodiments, can include sand machinery 281, gel machinery 282, blender machinery 283, pump machinery 284, generator machinery 285, positioning machinery 286, control machinery 287, and/or other machinery 288. The machinery may be, for example, truck, skid or rig-mounted, or otherwise present at the wellsite 270, without departing from the scope of the present disclosure. The sand machinery 281 may include transport trucks or other vehicles for hauling to and storing at the wellsite 270 sand for use in an operation. The gel machinery 282 may include transport trucks or other vehicles for hauling to and storing at the wellsite 270 materials used to make a gelled treatment fluid for use in an operation. The blender machinery 283 may include blenders, or mixers, for blending materials at the wellsite 270 for an operation. The pump machinery 284 may include pump trucks or other vehicles or conveyance equipment for pumping materials down the wellbore 275 for an operation. The generator machinery 285 may include generator trucks or other vehicles or equipment for generating electric power at the wellsite 270 for an operation. The electric power may be used by sensors, control machinery, and/or other machinery. The positioning equipment 286 may include earth movers, cranes, rigs or other equipment to move, locate or position equipment or materials at the wellsite 270 or in the wellbore 275.

The control machinery 287 may include an instrument truck coupled to some, all, or substantially all of the other equipment at the wellsite 270 and/or to remote systems or equipment. The control machinery 287 may be connected by wireline or wirelessly to other equipment to receive data for or during an operation. The data may be received in real-time or otherwise. In another embodiment, data from or for equipment may be keyed into the control machinery.

The control machinery 287 may include a computer system for planning, monitoring, performing or analyzing the job. Such a computer system may be part of a distributed computing system with data sensed, collected, stored, processed and used from, at or by different equipment or locations. The other machinery 288 may include equipment also used at the wellsite 270 to perform an operation.

In other examples, the other machinery 288 may include personal or other vehicles used to transport workers to the wellsite 270 but not directly used at the wellsite 270 for performing an operation.

Many if not most of these various machinery at the wellsite 270 accordingly utilize a diesel or other fuel types to perform their functionality. Such fuel is expended and exhausted as exhaust gas, such as exhaust gas 4 including $CO_2$. The embodiments described herein provide a system and method for recovering $CO_2$ captured from such machinery 280 located and operated at a wellsite 270, and potentially reducing atmospheric $CO_2$ emissions, while reducing material and time costs. It is to be appreciated that other configurations of the wellsite 270 may be employed, without departing from the scope of the present disclosure. Although a number of various machinery 280 at wellsite 270 have been mentioned, many other machinery may utilize diesel or other fuel that creates exhaust gas including $CO_2$ that may conventionally be exhausted into the atmosphere, but herein utilized during the production of hydrogen gas, as described herein.

In some embodiments, the present disclosure provides collecting exhaust gas 4 from which recovered $CO_2$ 40 is recovered from such machinery 280 located and operated at a wellsite 270 and sequestering recovered $CO_2$ 40 from such collected exhaust gas 4 by introduction downhole (e.g., as recovered $CO_2$ 40, or after production of intermediate product 41 therefrom). Alternatively or additionally, the recovered (e.g., substantially pure) $CO_2$ 40 can be utilized in another application, and not introduced downhole. In embodiments, the exhaust gas 4 can be produced by fracturing equipment (e.g., hydraulic fracturing pumping equipment 284, hydraulic horsepower pumping units 284, electrical generation natural gas turbine units 288, electrical generation reciprocating natural gas power units 285, or a combination thereof) utilized to fracture a formation during a fracturing operation in formation 260.

Although described hereinabove with reference to a wellsite 270, a source of the exhaust gas comprising $CO_2$ can be any convenient exhaust gas. The exhaust gas source 5 can be a gaseous $CO_2$ source. This gaseous $CO_2$ source may vary widely, ranging from air, industrial waste streams, etc. As noted above, the exhaust gas source 5 can, in certain instances, include an exhaust waste product from an industrial plant. The nature of the industrial plant may vary in these embodiments, where industrial plants of interest include power plants, chemical processing plants, and other industrial plants that produce flue or exhaust gas comprising $CO_2$ as a byproduct. By waste stream is meant a stream of gas (or analogous stream) that is produced as a byproduct of an active process of the industrial plant, e.g., an exhaust gas or flue gas. The gaseous stream may be substantially pure $CO_2$ or a multi-component gaseous stream that includes $CO_2$ and one or more additional gases. Multi-component gaseous streams (containing $CO_2$) that may be employed as a captured exhaust gas source 5 in embodiments of the subject methods include both reducing, e.g., syngas, shifted syngas, natural gas, and hydrogen and the like, and oxidizing condition streams, e.g., flue gases from combustion. Particular multi-component gaseous streams of interest that may be treated according to the subject invention include: oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

The exhaust gas source 5 can comprise greater than or equal to about 5, 6, 7, 8, 9, 10, 15, 20, 25, 30, 40, 50, 60, 70, 80, 90, 95, 96, 97, 98, 99, or 100 volume percent (vol %) $CO_2$. In embodiments, the exhaust gas source 5 includes primarily $CO_2$ (e.g., greater than or equal to about 50, 60, 70, 80, 90, 95, 96, 97, 98, 99, or 100 volume percent (vol %) $CO_2$). For example, when an exhaust gas comprising $CO_2$ is obtained from a waste gas produced at a different jobsite than the wellsite 270, $CO_2$ can be separated from the waste gas in order to reduce a volume of gas to be transported to the wellsite 270. For example, when the exhaust gas includes a flue gas from a power plant, which typically contains from about 7 to about 10 vol. % $CO_2$, the method can further include transporting the exhaust gas (or a waste gas from which the exhaust gas 4 comprising $CO_2$ is obtained) from the another jobsite at which the exhaust gas is obtained to the wellsite 270. In embodiments, the method can further include separating captured exhaust gas 4 from a waste gas including $CO_2$, prior to transport to wellsite 270, to reduce a volume of gas for transport. Although the separating of the $CO_2$ from the exhaust gas comprising $CO_2$ can be performed at the wellsite 270 (e.g., after transport of the waste gas from the another jobsite at which the waste gas is obtained and/or produced to the wellsite 270), to facilitate transportation, the separating of the exhaust gas 4 from a waste gas can be performed at the another jobsite at which the waste gas is produced and/or obtained and subsequently, the exhaust gas 4 can be transported to the wellsite 270.

Figure 4:
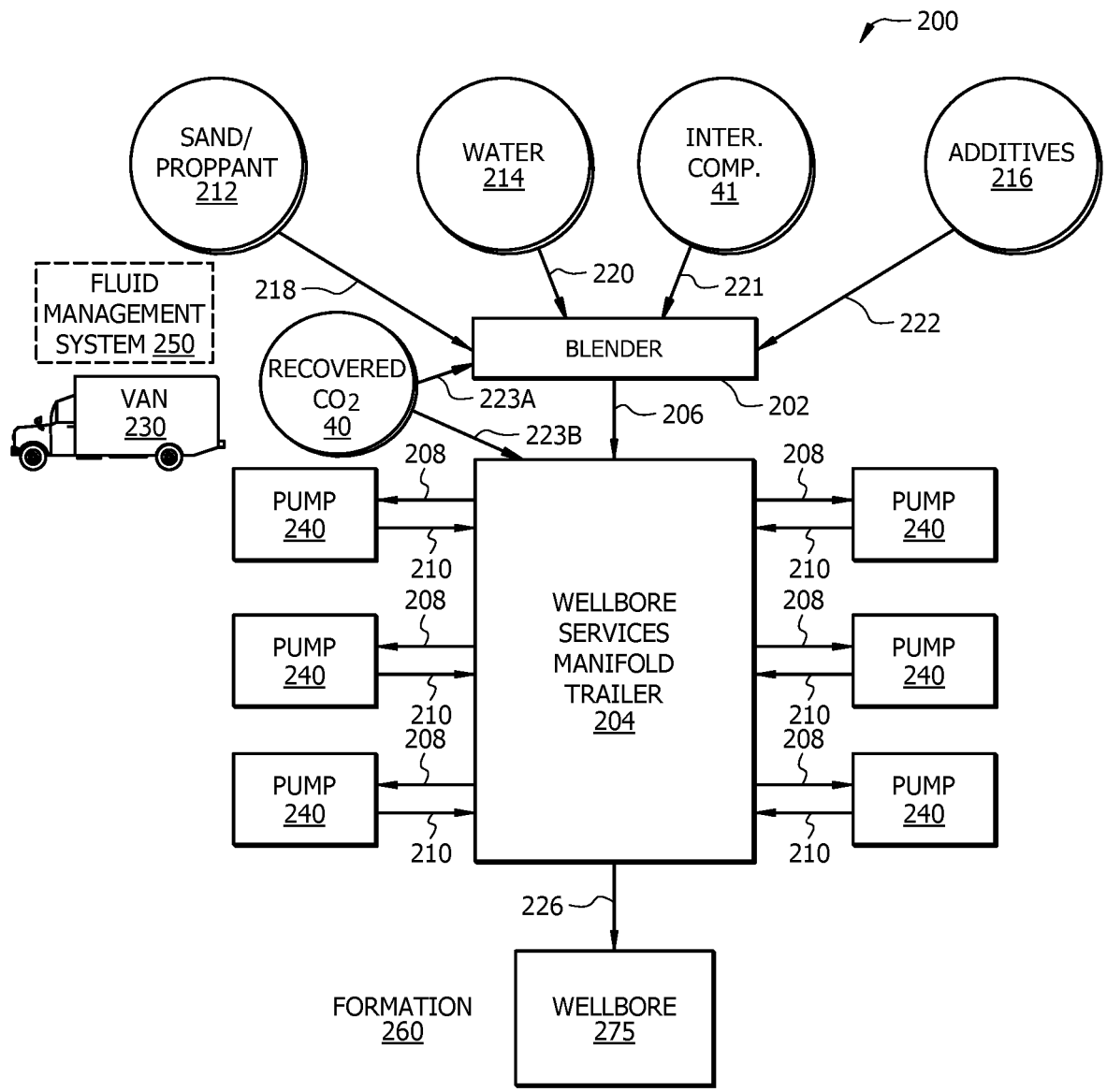
FIG. 4 is a schematic representation of an embodiment of a wellbore servicing system of this disclosure.

FIG. 4 is a schematic representation of an embodiment of a wellbore servicing system 200 of this disclosure. As noted herein, method I can further include placing at least a portion of the recovered carbon dioxide 40 into a wellbore 275 penetrating a subterranean formation 260, as indicated at 3 of FIG. 1. A system of this disclosure can further comprise one or a plurality of pumps 240; a fluid manifold 204 providing fluid communication between each of the one or the plurality of pumps 240 and a wellbore 275 in a subterranean formation 260; auxiliary equipment selected from a fluid management system 250, a datavan 230, a blender unit 202 providing a source of treatment fluids to the one or the plurality of pumps 240, one or more conveyors or lines 218/220/222/221/223A/223B for transporting one or more components (e.g., proppant, sand 212, water 214, additives 216, intermediate component 41, recovered $CO_2$ 40) of a treatment fluid 206 comprising the recovered $CO_2$ 40 and/or the intermediate product 41 to the blender 202, or another auxiliary equipment (e.g., wellbore services manifold trailer 204).

In embodiments, the recovered $CO_2$ 40 can be introduced directly downhole, for example, as part of an enhanced oil recovery (EOR), in which case blender 202 can be absent. In embodiments, the intermediate product 41 and/or recovered $CO_2$ 40 can be introduced downhole as a component of a treatment fluid 206 to carry out subterranean treatments in conjunction with a variety of subterranean operations, including, but not limited to, hydraulic fracturing operations, fracturing acidizing operations to be followed with proppant hydraulic fracturing operations, stimulation treatments, and the like. It is to be understood that any number of fluids can be pumped downhole or elsewhere during a variety of applications, and such are intended to be within the scope of this disclosure.

By way of example, in embodiments, a treatment fluid 206 (e.g., comprising recovered $CO_2$ 40 and/or intermediate product 41) may be introduced into a wellbore 275 that penetrates a subterranean formation 260 at a pressure sufficient to create or enhance one or more fractures within the subterranean formation 260 (for example, hydraulic fracturing) and/or to create or enhance and treat microfractures within a subterranean formation 260 in fluid communication with a primary fracture in the formation. In embodiments, a treatment fluid 206 may be used to treat pre-existing fractures, or fractures created using a different treatment fluid. In embodiments, a treatment fluid 206 may be introduced at a pressure sufficient to create or enhance one or more fractures within the formation, and one or more of the treatment fluids comprising a proppant material 212 subsequently may be introduced into the formation 260.

Microwave pyrolysis is utilized in the system and method of this disclosure to provide an energy-efficient method for recovering recovered carbon dioxide 40 (and regenerating the solid metal alkaline 35), thus reducing energy consumption and associated costs relative to conventional heating techniques. Microwave-assisted heating, as utilized herein, can directly act on molecules, reducing reaction time (e.g., time for desorption of recovered $CO_2$ 40), improving energy utilization efficiency, and reducing cost.

Utilizing microwave pyrolysis for sorbent regeneration, as described herein, can be advantageous, as it can provide rapid and energy-efficient heating, making the adsorbent (e.g., solid metal alkaline 35) regeneration step more efficient relative to conventional heating/desorption methods.

The metal alkaline (e.g., solid metal alkaline 15/35, metal alkaline solution 16) can be reused multiple times, making the herein disclosed system and process more sustainable and cost-effective than conventional methods. The herein disclosed system and method can relatively easily be scaled up to commercial scale.

ADDITIONAL DISCLOSURE

The following are non-limiting, specific embodiments in accordance with the present disclosure:

In a first embodiment, a method comprises: reacting carbon dioxide from exhaust gas produced at a wellsite to produce a solid metal carbonate; and microwaving the solid metal carbonate to produce recovered carbon dioxide and solid metal alkaline.

A second embodiment can include the method of the first embodiment further comprising placing at least a portion of the recovered carbon dioxide into a wellbore penetrating a subterranean formation, and/or wherein the recovered carbon dioxide is greater than or equal to about 99, 99.5, or 99.9 vol % carbon dioxide.

A third embodiment can include the method of the first or the second embodiment, further comprising converting at least the portion of the recovered carbon dioxide to an intermediate product (optionally placing the intermediate product into the wellbore).

A fourth embodiment can include the method of any one of the first to third embodiments, wherein reacting carbon dioxide from exhaust gas produced at the wellsite to produce the solid metal carbonate further comprises: reacting the carbon dioxide with a metal oxide to produce the solid metal carbonate.

A fifth embodiment can include the method of the fourth embodiment, wherein the metal oxide comprises a solid metal oxide (e.g., produced by diminution (e.g., grinding) of a coarse metal oxide), wherein the solid metal oxide has a surface area of at least 5 $m^2$/gram, 100 $m^2$/gram, or 5,000 $m^2$/gram, an average size of less than or equal to about 5 μm, 100 μm, or 5 mm, or a combination thereof.

A sixth embodiment can include the method of the fourth or fifth embodiment, wherein the solid metal oxide comprises calcium oxide, magnesium oxide, or a combination thereof, and wherein the metal carbonate respectively comprises calcium carbonate, magnesium carbonate, or a combination thereof.

A seventh embodiment can include the method of any one of the fourth to sixth embodiments, wherein the reacting carbon dioxide from exhaust gas produced at the wellsite to produce the solid metal carbonate further comprises exposing the solid metal oxide to the exhaust gas comprising $CO_2$.

An eighth embodiment can include the method of the seventh embodiment, wherein exposing the solid metal oxide to the exhaust gas comprising $CO_2$ is effected via a spraying tower, a fluidized bed reactor, a packed column, or a combination thereof.

A ninth embodiment can include the method of any one of the first to eighth embodiments, wherein reacting carbon dioxide from exhaust gas produced at the wellsite to produce the solid metal carbonate further comprises: reacting the carbon dioxide with a metal alkaline solution to produce a metal carbonate solution comprising the solid metal carbonate in water.

A tenth embodiment can include the method of the ninth embodiment, wherein the metal alkaline solution comprises an aqueous alkaline hydroxide.

An eleventh embodiment can include the method of the tenth embodiment, wherein the alkaline hydroxide comprises sodium hydroxide (NaOH), potassium hydroxide (KOH), or a combination thereof.

A twelfth embodiment can include the method of any one of the ninth to eleventh embodiments, wherein reacting the carbon dioxide with the metal alkaline solution to produce the solid metal carbonate in water further comprises contacting the exhaust gas with the metal alkaline solution.

A thirteenth embodiment can include the method of the twelfth embodiment, wherein contacting the exhaust gas with the metal alkaline solution comprises introducing the exhaust gas into the metal alkaline solution.

A fourteenth embodiment can include the method of the thirteenth embodiment, wherein the exhaust gas is contacted with the metal alkaline solution via a batch reactor, sequential batch reactor, continuous-flow reactor, continuous stirred tank reactor, or a combination thereof.

A fifteenth embodiment can include the method of any one of the ninth to fourteenth embodiments, wherein the metal alkaline solution comprises aqueous sodium hydroxide (NaOH), aqueous potassium hydroxide (KOH), or a combination thereof, and wherein the metal carbonate respectively comprises sodium carbonate ($Na_2CO_3$), potassium carbonate ($K_2CO_3$), or a combination thereof.

A sixteenth embodiment can include the method of any one of the ninth to fifteenth embodiments further comprising separating water from the metal carbonate solution prior to or during the microwaving the solid metal carbonate to produce recovered carbon dioxide and solid metal alkaline.

A seventeenth embodiment can include the method of the sixteenth embodiment further comprising combining at least a portion of the separated water with the solid metal alkaline to produce additional metal alkaline solution.

An eighteenth embodiment can include the method of any one of the first to seventeenth embodiments further comprising recycling the solid metal alkaline to produce additional solid metal carbonate by reacting carbon dioxide from exhaust gas produced at the wellsite.

A nineteenth embodiment can include the method of the eighteenth embodiment, wherein the reacting carbon dioxide from exhaust gas produced at the wellsite to produce solid metal carbonate is effected by contacting the carbon dioxide with a metal hydroxide solution comprising water and a metal hydroxide to produce a metal carbonate solution comprising the solid metal carbonate and water, and wherein the method further comprises contacting the solid metal alkaline with water to produce additional metal hydroxide solution, and producing additional metal carbonate solution by contacting the additional metal hydroxide solution with carbon dioxide from exhaust gas produced at the wellsite.

In a twentieth embodiment, a system comprises: a metal carbonate production reactor configured for reacting carbon dioxide from exhaust gas produced at a wellsite with a metal alkaline to produce a solid metal carbonate; and a microwave pyrolysis reactor configured for microwaving the solid metal carbonate to produce recovered carbon dioxide and solid metal alkaline.

A twenty first embodiment can include the system of the twentieth embodiment further comprising pumping apparatus configured for placing at least a portion of the recovered carbon dioxide into a wellbore penetrating a subterranean formation and/or wherein the recovered carbon dioxide is greater than or equal to about 99, 99.5, or 99.9 vol % carbon dioxide.

A twenty second embodiment can include the system of the twentieth or the twenty first embodiment further comprising downstream production apparatus configured to produce an intermediate product from at least a portion of the recovered $CO_2$.

A twenty third embodiment can include the system of any one of the twentieth to twenty second embodiments, wherein the metal carbonate production reactor is configured for reacting the carbon dioxide with a metal oxide to produce the solid metal carbonate.

A twenty fourth embodiment can include the system of the twenty third embodiment, wherein the metal oxide comprises a solid metal oxide (e.g., produced by diminution (e.g., grinding) of a coarse metal oxide), wherein the solid metal oxide has a surface area of at least 5 $m^2$/gram, 100 $m^2$/gram, or 5,000 $m^2$/gram, an average size of less than or equal to about 5 μm, 100 μm, or 5 mm, or a combination thereof.

A twenty fifth embodiment can include the system of the twenty third or twenty fourth embodiment, wherein the metal oxide comprises calcium oxide, magnesium oxide, or a combination thereof, and wherein the metal carbonate respectively comprises calcium carbonate, magnesium carbonate, or a combination thereof.

A twenty sixth embodiment can include the system of any one of the twenty third to twenty fifth embodiments, wherein the metal carbonate production reactor is configured for exposing the solid metal oxide to the exhaust gas comprising $CO_2$.

A twenty seventh embodiment can include the system of the twenty sixth embodiment, wherein the metal carbonate production reactor comprises a spraying tower, a fluidized bed reactor, a packed column, or a combination thereof.

A twenty eighth embodiment can include the system of any one of the twentieth to twenty seventh embodiments, wherein the metal carbonate production reactor is configured for reacting the carbon dioxide with a metal alkaline solution to produce a metal carbonate solution comprising the solid metal carbonate in water.

A twenty ninth embodiment can include the system of the twenty eighth embodiment, wherein the metal alkaline solution comprises an aqueous alkaline hydroxide.

A thirtieth embodiment can include the system of the twenty ninth embodiment, wherein the alkaline hydroxide comprises sodium hydroxide (NaOH), potassium hydroxide (KOH), or a combination thereof.

A thirty first embodiment can include the system of any one of the twenty eighth to thirtieth embodiments, wherein the metal carbonate production reactor is configured for contacting the exhaust gas with the metal alkaline solution.

A thirty second embodiment can include the system of the thirty first embodiment, wherein contacting the exhaust gas with the metal alkaline solution in the metal carbonate production reactor is effected by introducing the exhaust gas into the metal alkaline solution in the metal carbonate production reactor.

A thirty third embodiment can include the system of the thirty second embodiment, wherein the metal carbonate production reactor comprises a batch reactor, a sequential batch reactor, a continuous-flow reactor, a continuous stirred tank reactor, or a combination thereof.

A thirty fourth embodiment can include the system of any one of the twenty eighth to thirty third embodiments, wherein the metal alkaline solution comprises aqueous sodium hydroxide (NaOH), aqueous potassium hydroxide (KOH), or a combination thereof, and wherein the metal carbonate respectively comprises sodium carbonate ($Na_2CO_3$), potassium carbonate ($K_2CO_3$), or a combination thereof.

A thirty fifth embodiment can include the system of any one of the twenty eighth to thirty fourth embodiments further comprising a solid/liquid separator configured for separating water from the metal carbonate solution.

A thirty sixth embodiment can include the system of the thirty fifth embodiment further comprising a water recycle line configured for combining at least a portion of the separated water with the solid metal alkaline to produce additional metal alkaline solution for reaction in the metal carbonate production reactor.

A thirty seventh embodiment can include the system of any one of the twentieth to thirty sixth embodiments further comprising a solid metal alkaline recycle line configured for recycling the solid metal alkaline to the metal carbonate production reactor for the production of additional solid metal carbonate.

A thirty eighth embodiment can include the system of the thirty seventh embodiment, wherein the metal carbonate production reactor is configured to produce solid metal carbonate by contacting the carbon dioxide with a metal hydroxide solution comprising water and a metal hydroxide to produce a metal carbonate solution comprising the solid metal carbonate and water, and wherein the system further comprises a fresh or recycle water line configured for combining the solid metal alkaline with fresh or recycle water in the fresh or recycle water line, respectively, to produce additional metal hydroxide solution for use in the metal carbonate production reactor.

In a thirty ninth embodiment, a method comprises: microwaving a solid metal carbonate to produce recovered carbon dioxide and solid metal alkaline; and placing, at a wellsite, at least a portion of the recovered carbon dioxide into a wellbore penetrating a subterranean formation.

A fortieth embodiment can include the method of the thirty ninth embodiment, wherein placing the at least the portion of the recovered carbon dioxide into the wellbore penetrating the subterranean formation further comprises converting the at least a portion of the carbon dioxide to an intermediate product and placing the intermediate product into the wellbore.

A forty first embodiment can include the method of the thirty ninth or fortieth embodiment further comprising: producing the solid metal carbonate by contacting a metal alkaline with an exhaust gas comprising carbon dioxide ($CO_2$).

A forty second embodiment can include the method of the forty first embodiment, wherein the exhaust gas is produced at the or another wellsite.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru-Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
reacting carbon dioxide from exhaust gas produced at a wellsite to produce a solid metal carbonate by reacting the carbon dioxide with a metal alkaline; and
microwaving the solid metal carbonate to produce recovered carbon dioxide and solid metal alkaline.

2. The method of claim 1 wherein the recovered carbon dioxide is greater than or equal to about 99% pure carbon dioxide.

3. The method of claim 1 further comprising converting at least a portion of the recovered carbon dioxide to an intermediate product.

4. The method of claim 1, wherein reacting carbon dioxide from exhaust gas produced at the wellsite to produce the solid metal carbonate further comprises:
reacting the carbon dioxide with a metal oxide to produce the solid metal carbonate.

5. The method of claim 1, wherein reacting carbon dioxide from exhaust gas produced at the wellsite to produce the solid metal carbonate further comprises:
reacting the carbon dioxide with a metal alkaline solution to produce a metal carbonate solution comprising the solid metal carbonate in water.

6. The method of claim 1 further comprising recycling the solid metal alkaline to produce additional solid metal carbonate by reacting carbon dioxide from exhaust gas produced at the wellsite.

7. The method of claim 1, wherein the recovered carbon dioxide comprises greater than or equal to about 99 percent carbon dioxide, and further comprising utilizing or storing the recovered carbon dioxide.

8. The method of claim 7, wherein utilizing further comprises utilizing at least a portion of the recovered carbon dioxide in the formation of carbonated beverages, in food processing, in fire extinguishers, in dry ice production, for a medical application, to produce a chemical or pharmaceutical industry product, for enhanced oil recovery (EOR) or another application in the oil and gas industry, and/or to produce a renewable fuel.

9. The method of claim 1, wherein the microwaving is performed at a power of from about 100 watts (W) to about 10 kilowatts (kW).

10. The method of claim 3, wherein the intermediate product comprises formic acid, methanol, methane, or a combination thereof.

11. The method of claim 1, wherein the exhaust gas produced at the wellsite is produced at the wellsite via a subterranean operation selected from hydraulic fracturing, acidizing, stimulation, or a combination thereof.

12. The method of claim 1 further comprising carrying out a subterranean formation operation to produce at least a portion of the exhaust gas produced at the wellsite.

13. The method of claim 1, wherein the exhaust gas is produced from machinery selected from sand machinery, gel machinery, blender machinery, pump machinery, generator machinery, positioning machinery, control machinery, or a combination thereof.

14. A system comprising:
a metal carbonate production reactor configured for reacting carbon dioxide from exhaust gas produced at a wellsite with a metal alkaline to produce a solid metal carbonate, wherein the metal carbonate production reactor is configured for reacting the carbon dioxide with a metal alkaline; and a microwave pyrolysis reactor configured for microwaving the solid metal carbonate to produce recovered carbon dioxide and solid metal alkaline.

15. The system of claim 14, wherein the metal carbonate production reactor is configured for reacting the carbon dioxide with a metal oxide to produce the solid metal carbonate.

16. The system of claim 14, wherein the metal carbonate production reactor is configured for reacting the carbon dioxide with a metal alkaline solution to produce a metal carbonate solution comprising the solid metal carbonate in water.

17. The system of claim 16 further comprising a solid/liquid separator configured for separating water from the metal carbonate solution.

18. The system of claim 17 further comprising a water recycle line configured for combining at least a portion of the separated water with the solid metal alkaline to produce additional metal alkaline solution for reaction in the metal carbonate production reactor.

19. The system of claim 14 further comprising a solid metal alkaline recycle line configured for recycling the solid metal alkaline to the metal carbonate production reactor for the production of additional solid metal carbonate.

20. The system of claim 19, wherein the metal carbonate production reactor is configured to produce solid metal carbonate by contacting the carbon dioxide with a metal hydroxide solution comprising water and a metal hydroxide to produce a metal carbonate solution comprising the solid metal carbonate and water, and wherein the system further comprises a fresh or recycle water line configured for combining the solid metal alkaline with fresh or recycle water in the fresh or recycle water line, respectively, to produce additional metal hydroxide solution for use in the metal carbonate production reactor.

* * * * *